United States Patent [19]
Brezovnik et al.

[11] Patent Number: 6,164,812
[45] Date of Patent: Dec. 26, 2000

[54] ELECTRIC FOOD PROCESSOR HAVING AT LEAST THREE MUTUALLY CONCENTRIC OUTPUT DRIVES

[75] Inventors: Peter Brezovnik, Mozirje; Aleksander Oblak, Recice/Savinji, both of Slovenia; Helmut Augustin, Chieming, Germany

[73] Assignee: BSH Bosch und Siemens Hausgeraete GmbH, Munich, Germany

[21] Appl. No.: 09/084,716

[22] Filed: May 26, 1998

[30] Foreign Application Priority Data

May 26, 1997 [DE] Germany ............................ 197 21 978

[51] Int. Cl.⁷ ...................................................... B01F 7/00
[52] U.S. Cl. ........................... 366/314; 475/332; 475/337; 74/665 K; 74/665 L
[58] Field of Search ..................................... 366/314, 205, 366/100, 292–294; 475/166, 174, 332, 337; 241/98, 101.2, 199.12; 74/665 K

[56] References Cited

U.S. PATENT DOCUMENTS

| | | |
|---|---|---|
| 2,137,778 | 11/1938 | McCullough . |
| 2,390,742 | 12/1945 | Setterlund . |
| 2,807,447 | 9/1957 | Vaughan . |
| 3,951,351 | 4/1976 | Ernster et al. . |
| 4,095,488 | 6/1978 | Nilsson . |
| 4,141,259 | 2/1979 | Appleberry . |
| 4,193,325 | 3/1980 | Cotreau . |
| 4,260,272 | 4/1981 | Lebecque . |
| 4,380,398 | 4/1983 | Burgess ..................................... 366/261 |
| 4,697,929 | 10/1987 | Muller ....................................... 366/97 |
| 4,918,665 | 4/1990 | Herfeld ..................................... 366/294 |

FOREIGN PATENT DOCUMENTS

| | | |
|---|---|---|
| 0022465 | 5/1980 | European Pat. Off. . |
| 2218347 | 11/1989 | United Kingdom . |

*Primary Examiner*—W. L. Walker
*Assistant Examiner*—Marianne S. Ocampo
*Attorney, Agent, or Firm*—Herbert L. Lerner; Laurence A. Greenberg; Werner H. Stemer

[57] ABSTRACT

The electric food processor has a housing in which there is disposed an electric motor with a motor shaft. The motor shaft, via a gear mechanism, drives three or more concentric output drives at different rotational speeds. The common axis of rotation of the output drives is spaced a distance from the motor shaft. Working tools are selectively coupled to the output drives and the working tools rotate in a working container which is placed on the housing. In order to expand the possible uses of the food processor, the fastest output drive rotates at a speed that is suitable for a mixing tool, and the gear mechanism has at least two sets of input gear teeth that are rotatably mounted independently of each other, so that the fastest output drive can be driven out of direct engagement with the slower output drives.

13 Claims, 5 Drawing Sheets

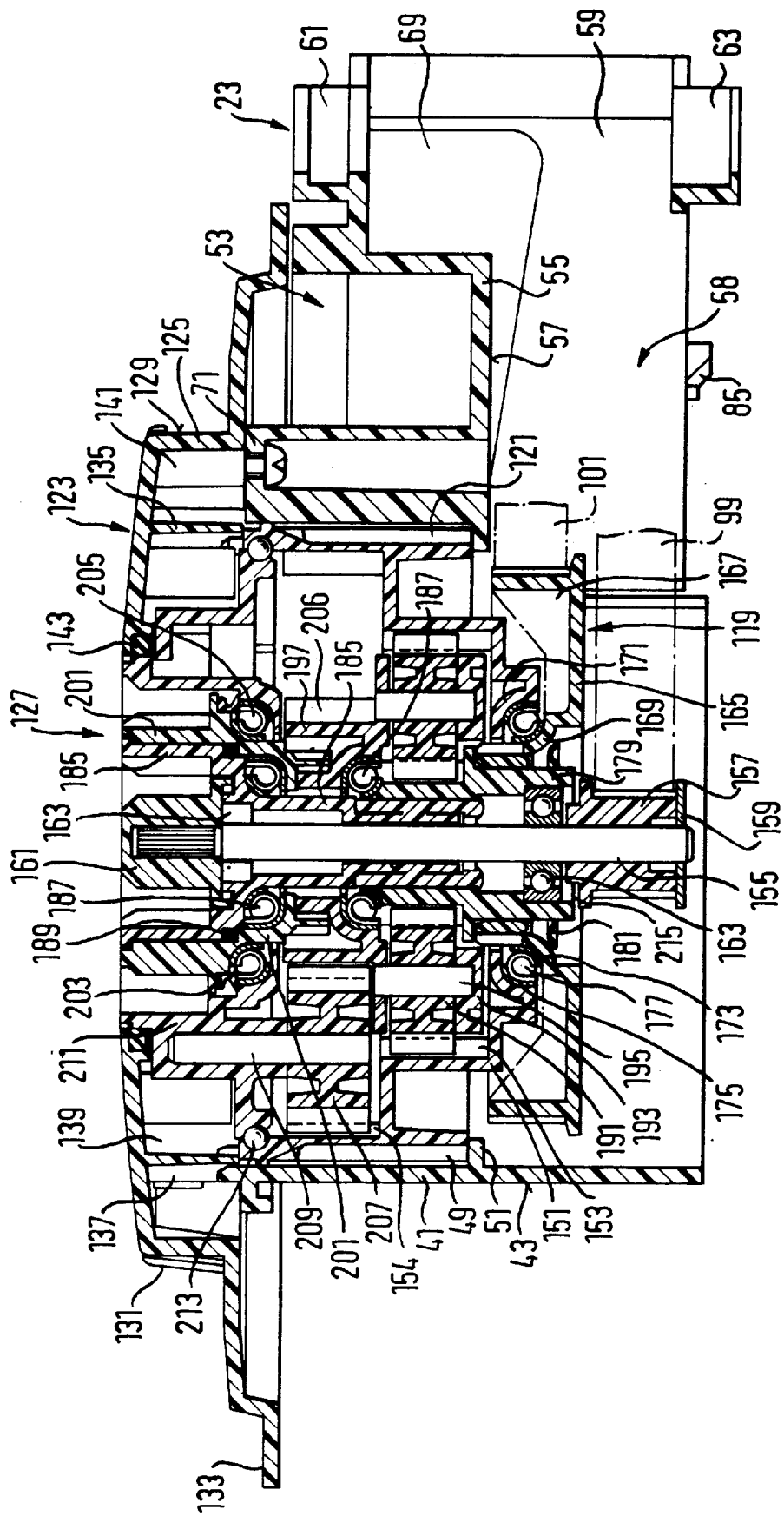

ELECTRIC FOOD PROCESSOR HAVING AT LEAST THREE MUTUALLY CONCENTRIC OUTPUT DRIVES

BACKGROUND OF THE INVENTION

1. Field of the Invention

The present invention relates to an electric food processor having a housing in which there is disposed an electric motor with a motor shaft which, via a gear mechanism, drives at least three concentric output drives at different rotational speeds. The common axis of rotation of the output drives is set at a distance from the motor shaft. Working tools may be coupled to the output drives which rotate in a working container that can be placed on the housing.

2. Description of the Related Art

A food processor of that type is disclosed by EP 0 022 465. The drive unit of that prior art food processor is constructed with an output drive shaft whose output drive end is constructed as a first output drive for a first plug-on tool. Arranged coaxially with the output drive shaft is a first output drive sleeve as a second output drive for a second plug-on tool. The first output drive sleeve is thereby driven by the output drive shaft by means of a first step-down gear mechanism. In order to obtain a third output drive for a third tool, a second, set-back, second output drive sleeve is mounted between the output drive shaft and the first output drive sleeve, is used at the end as a third output drive and can be driven by the output drive shaft by means of a second step-down gear mechanism. Parallel to the common axis of rotation of the three concentric output drives, and set at a distance from them, the upper end of the vertical motor shaft or the coupling element that is placed on the latter serves as a fourth output drive for a fourth type of kitchen appliance, which can be driven at high speed.

SUMMARY OF THE INVENTION

It is accordingly an object of the invention to provide an electric food processor, with concentric output drives which makes it possible to carry out as many processing operations as possible at different rotational speeds.

With the foregoing and other objects in view there is provided, in accordance with the invention, an electric food processor, comprising:

a housing;

an electric motor disposed in the housing, the electric motor having a motor shaft;

a gear mechanism connected to the motor shaft;

at least three mutually concentric output drives driven by the gear mechanism at mutually different rotational speeds, the output drives having a common axis of rotation at a spaced distance from the motor shaft, and the output drives being adapted to rotate working tools within a working container of the food processor to be placed on the housing;

the output drives including a fastest, first output drive rotatable at a speed that is suitable for a mixing tool, and relatively slower, second and third output drives; and the gear mechanism having at least two sets of independently rotatable input gear teeth whereby the first output drive is driven out of direct engagement with the second and third output drives.

The objects of the invention are thus satisfied in that the first output drive is the fastest and rotates at a speed suitable for a mixing tool, and in that the gear mechanism has at least two sets of input gear teeth that are rotatably mounted independently of each other, so that the first output drive can be driven out of direct engagement with the slower, second and third output drives. The mixing container therefore no longer has to be placed on an output drive that is physically separate from the concentric output drives. All the processing operations, such as kneading, stirring, chopping, mixing, with their different speeds and torques, can be carried out at one point on the food processor using the different working containers. Since the gear mechanism has two gear inputs that are independent of each other, it is not necessary for the rotation of the second and of the further output drives to be derived from the very fast first output drive, for example through gear transmissions. As a result of this decoupling between the first output drive and the further output drives, the development of noise and heat in the gear mechanism is reduced considerably, with a simple construction. This makes it possible to produce major parts of the gear mechanism from plastic, in spite of the high rotational speed of the first output drive and in spite of the considerable torques.

In order to achieve the most compact construction of the food processor, the gear mechanism has a planetary gear mechanism, which connects the second output drive and third output drive. In order to increase the number of output drives, the planetary gear mechanism is advantageously a multistage gear box. In order to keep the construction of the gear mechanism as simple as possible, the second output drive forms a sun wheel of the planetary gear mechanism. The shaft of the first output drive is advantageously mounted in the interior of a shaft of the second output drive, the shaft being a hollow shaft. This type of mounting, as distinct from direct mounting in the bottom of the housing of the food processor, enables stress-free assembly of the shaft of the first output drive having the planetary gear mechanism.

In accordance with an additional feature of the invention, the first output drive is connected to the motor shaft by means of at least a first belt. As a result, the distance between the first output drive and the motor shaft can be connected, in a cost-effective manner, with a transmission ratio of essentially 1:1 and with a high efficiency. If it is advantageous, it is also possible for two belts to be connected one after another via an intermediate shaft.

The construction is further simplified, in accordance with an added feature of the invention, where the second output drive is connected to the motor shaft via at least a second belt.

In accordance with a further feature of the invention, the speed of the concentric output drives decreases from the inside outwardly. It is thus possible for the greatest torque to be transmitted on the outside, at the lowest speed, and it is possible for the fastest and innermost output drive to be configured optimally in relation to its unbalanced behavior. Furthermore, as a result of the fact that the speeds decrease from the inside to the outside, the speed differences between adjacent output drives is kept as low as possible. This is associated with a reduction in the development of noise and heat.

The concentric output drives advantageously rotate at speeds between about 200 and 12,000 revolutions per minute (rpm). It is thus possible, on the concentric output drives, to realize all the modes of operation that are required in the daily use of a food processor, from chopping to mixing, at one location, specifically via the concentric output drives. Complicated additional gear mechanisms in the tools may be dispensed with.

In order to reduce the development of noise and heat, the concentric output drives have the same direction of rotation. This minimizes the speed differences between adjacent output drives.

In order to be able to use the high rotational speed of the electric motor for the mixing operation, the first output drive rotates essentially at the speed of the motor shaft, without complicated step-down and step-up gear mechanisms, which are associated with power losses.

In accordance with a concomitant feature of the invention, the food processor is provided with four mutually concentric output drives. This leads to a very compact food processor, which is suitable for all modes of operation having the widest possible range of torque and speed requirements.

Other features which are considered as characteristic for the invention are set forth in the appended claims.

Although the invention is illustrated and described herein as embodied in an electric food processor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 4b is a plan view thereof, indicating the section line IV—IV along which FIG. 4a is taken;

FIG. 7 is a sectional view of the gear-mechanism bearing part and a gear unit inserted therein, taken along the line VII—VII in FIG. 2.

DESCRIPTION OF THE PREFERRED EMBODIMENTS

Figure 1:
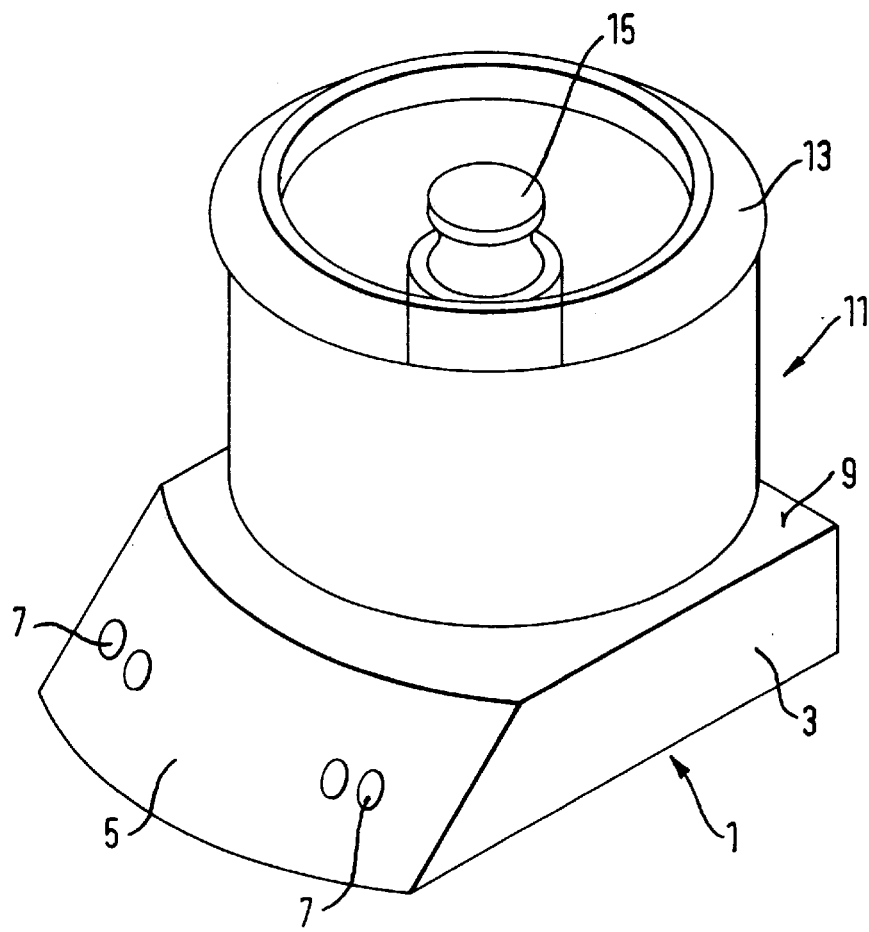
FIG. 1 is a perspective view of a food processor with a bowl placed on it.

Referring now to the figures of the drawing in detail and first, particularly, to FIG. 1 thereof, there is seen a flat food processor 1 with a non-illustrated base and a hood 3 placed thereon. The food processor has an operating panel 5 that is obliquely inclined toward the front (FIG. 1). Indicator and operating elements 7 of the food processor are arranged in this operating panel. A bowl 11 is fastened on a substantially planar working face 9 of the food processor 1, as is explained below. The bowl 11 is closed by a transparent lid 13. A kneading hook 15 is driven in the bowl 11, or further working tools are driven in non-illustrated further working containers, by an output drive that is arranged in the food processor 1, as explained below.

Figure 2:
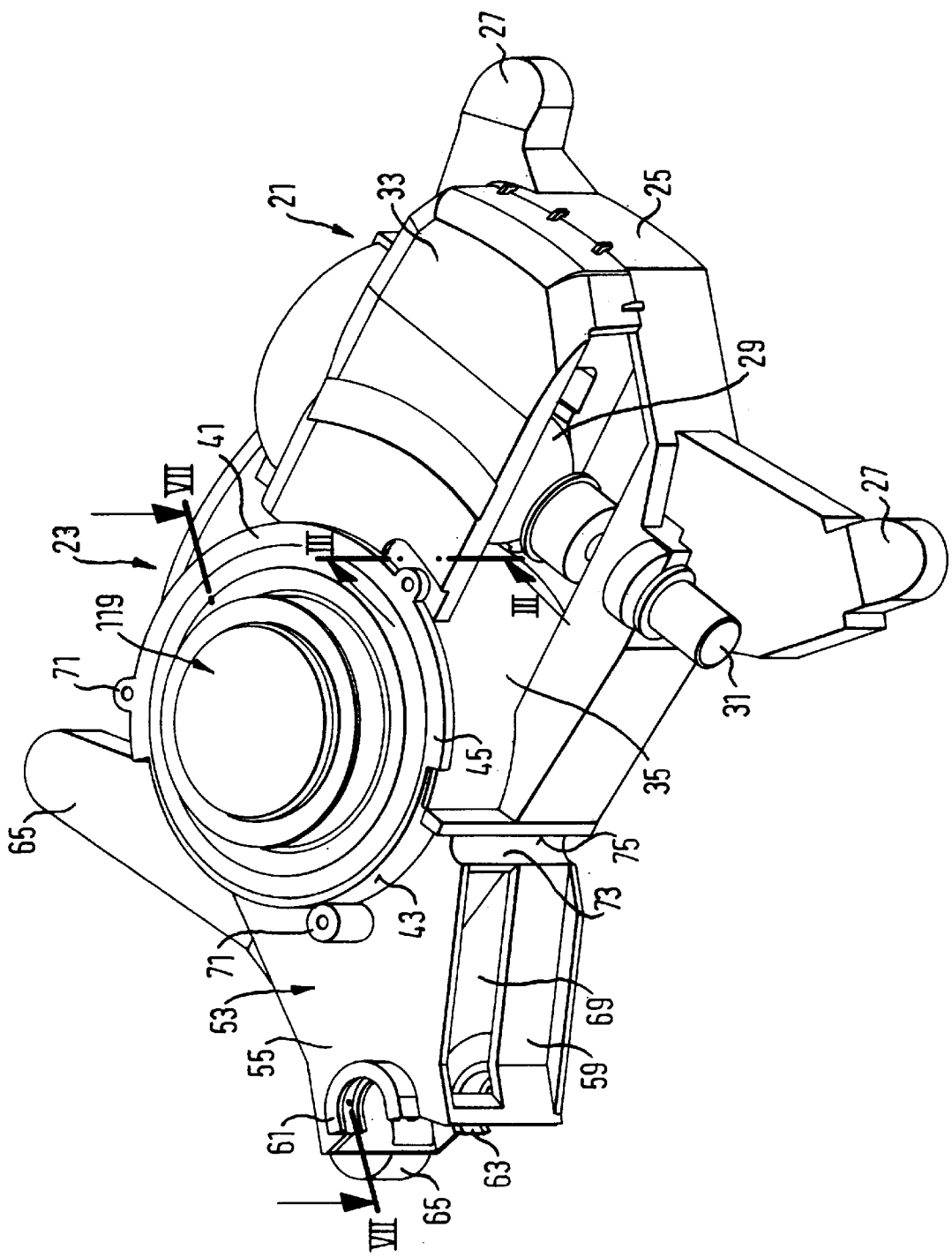
FIG. 2 is a simplified perspective view of a motor bearing part and a gear-mechanism bearing part of the food processor.

With reference to FIG. 2, a motor bearing part 21 and a gear-mechanism bearing part 23 made of plastic are disposed between the hood 3 and the base of the food processor 1. In its bottom region, the motor bearing part 21 has a baseplate 25, whose mechanical stability is increased, in particular, by stiffening ribs constructed on its underside. Extending away from the baseplate 25 are two first food-processor legs 27, to whose underside in each case supporting feet of the food processor 1 are fastened. The feet project through openings in the base. On the motor bearing part 21, an electric motor 29 is essentially horizontally inserted into an appropriately designed accommodating region. A motor shaft 31 of the electric motor 29 extends substantially horizontally away from the motor bearing part 21. The electric motor 29 is additionally held by a hood 33 that is fastened to the motor bearing part 21 or its baseplate 25.

Figure 3:
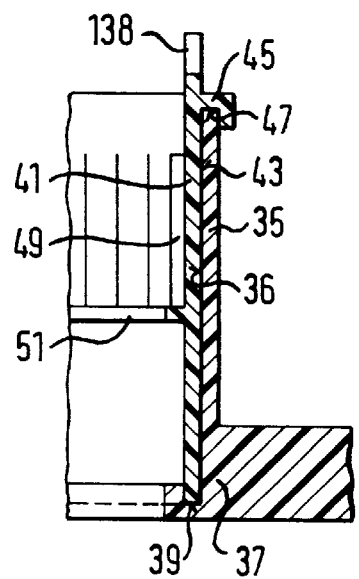
FIG. 3 is a partial, schematic sectional view taken along the line III—III in FIG. 2, at the contact faces of the motor and gear-mechanism bearing part.

In order not to unnecessarily complicate this specification and to simplify the illustration in FIG. 2, the electronics of the electric motor 29 and further components of the food processor which are well known to the skilled artisan are not illustrated. Laterally alongside the electric motor 29, the motor bearing part 21 is constructed as a claw-like bearing shell 35 having an inner wall 36 that has the shape of a circular cylinder section. The wall 36 serves as a contact face and it extends essentially over the entire height of the gear-mechanism bearing part 21. At right angles to this, the inner wall 36 extends over a circular section of about 210° (FIG. 3). A lower edge section 37 of the claw-like bearing shell 35 has a first groove 39 over the complete peripheral region of about 210 (cf. FIG. 3).

Figure 6:
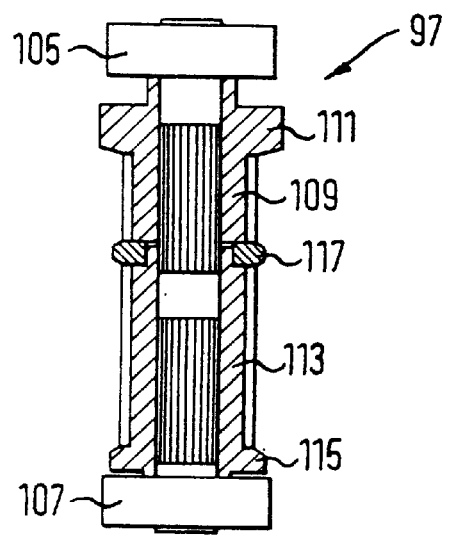
FIG. 6 is an enlarged sectional side view of an intermediate shaft held in the gear-mechanism bearing part.

A gear-mechanism bearing cylinder 41 of the gear-mechanism bearing part 23 is pushed from above into the bearing shell 35. During the action of pushing one into the other, parallel to the central axis of the circularly cylindrical section inner wall 36, an appropriately designed outer wall 43, designed like a cylindrical outer surface, of the gear-mechanism bearing cylinder 41 slides along the inner wall 36 of the bearing shell 35. In order to ensure assembly as far as possible without play, non-illustrated longitudinal ribs are formed on the inner wall 36. The end position is reached when the lower edge of the gear-mechanism bearing cylinder 41 fits into the first groove 39 of the bearing shell 35, and the upper edge of the bearing shell 35 fits into an appropriately formed second groove 47 on the upper edge section 45 of the gear-mechanism bearing cylinder 41 (FIG. 3). Bearing ribs 49, in which a gear unit 119 (described below) is held in a rotationally fixed manner, extend on the inner peripheral wall of the gear-mechanism bearing cylinder 41, in the upper half of the cylinder 41 (FIG. 7). Underneath the bearing ribs 49, on the periphery, there extends an inwardly projecting extension 51, which likewise serves to hold the gear unit 119. The gear unit 119 is illustrated only in very schematic form in FIG. 2, as distinct from FIG. 7, and is not illustrated in FIG. 3. To the side of the gear-mechanism bearing cylinder 41, there extends in the horizontal direction from the latter a gear-mechanism cylinder arm 53, which has in its upper half a main arm 55 with an underside 57. Underneath the underside 57 of the main arm 55 and of the annular extension 51, the gear-mechanism bearing cylinder 41 is open over an angular range of about 120°, and in this way forms a belt opening 58 (FIG. 7) in the gear-mechanism bearing part 23. From this opening, two bearing arms 59 extend laterally underneath the gear-mechanism cylinder arm 53 (FIG. 2, FIG. 7). In the end section that faces away from the gear unit 119, the main arm 55 and the two bearing arms 59 have an upper bearing shell 61 and a lower bearing shell 63 for the mounting of an intermediate shaft 97 (FIG. 6) which will be explained below. In addition, second food-processor legs 65, corresponding to the first food-processor legs 27, extend laterally from the gear-mechanism bearing cylinder 41 and the bearing arm 59. Provided between the main arm 55 and the bearing arm 59 that faces the electric motor 29 is a belt window 69 (FIG. 2, FIG. 7).

In order to fasten a cover plate 123 (FIG. 7) to the gear-mechanism bearing part 23 and the gear-mechanism bearing cylinder 41, screw eyes and screw sleeves 71 are constructed thereon. Constructed above the level of the gear-mechanism cylinder arm 53, and in the latter, is a vertically extending, channel-like belt-tensioner bearing shell 73 and, at a small distance from this on the motor bearing part 21, a belt-tensioner wall 75 (FIG. 2, FIG. 5). In the accommodating region formed in this way, a belt tensioner 77, which is shown in detail in FIGS. 4*a* and 4*b*, is clamped between the motor bearing part 21 and the gear-mechanism bearing part 23.

Figure 4A:
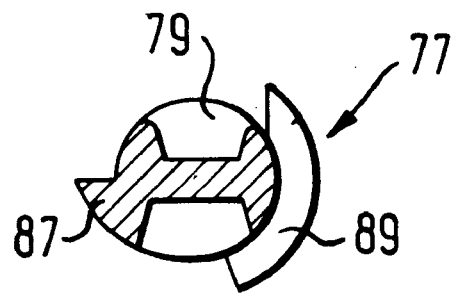
FIG. 4a is a cross-sectional view of a belt tensioner of the drive unit, on an enlarged scale.
Figure 4B:
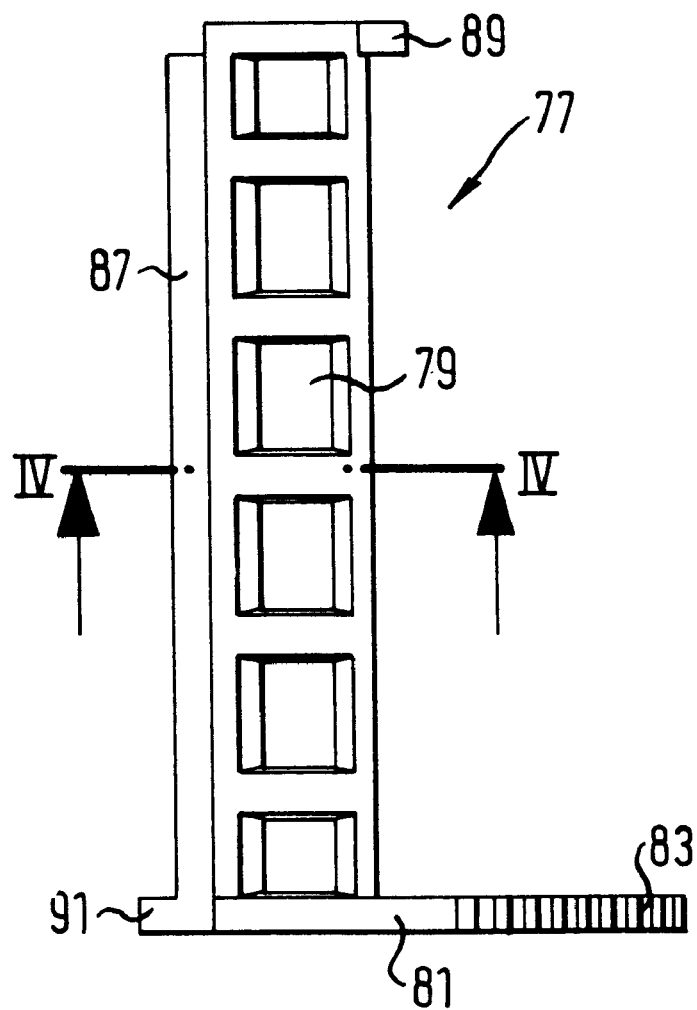
Figure 5:
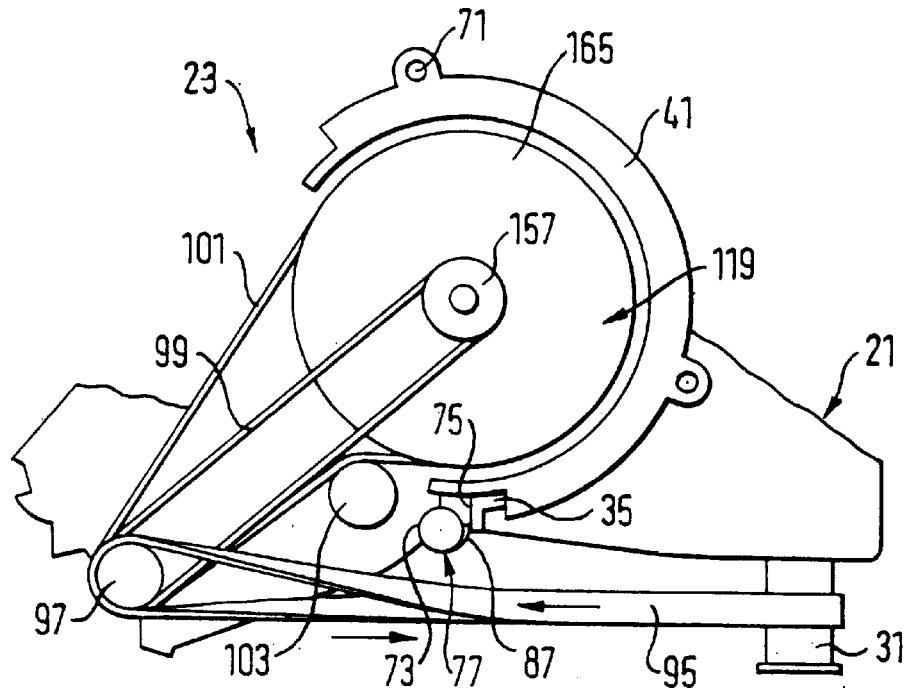
FIG. 5 is a simplified, partial plan view onto the motor bearing part and the gear-mechanism bearing part of FIG. 2.

The belt tensioner 77 has an essentially cylindrical main body 79, at whose lower end section a sickle-shaped actuating arm 81 extends such that it projects orthogonally from the axis of the main body 79 (FIGS. 4*a*, 4*b*). A set of teeth 83 is formed on the narrow outer wall of the actuating arm 81 is, which, in order to tension the belt, as is described below, cooperates with a latching tooth 85 that is constructed on the underside of the gear-mechanism bearing part 23 (FIG. 7). A clamping cam 87 extends over essentially the entire height of the belt tensioner 77. An upper protrusion 89 and a lower protrusion 91 respectively engage over the lower edge section 37 of the bearing shell 35 of the motor bearing part 21 and the upper side of the main arm 55 of the gear-mechanism bearing part 23, and in this way delimit the vertical distance between the two. In addition, the belt tensioner 77 is in this way held on the gear-mechanism bearing part 23 and the motor bearing part 21, in the corresponding accommodating region.

FIG. 5 shows, in an extract and in very simplified form, how a half-crossed intermediate-shaft belt 95 is tensioned between an intermediate shaft 97 (FIG. 6), which is held in the upper and lower bearing shell 61, 63 of the gear-mechanism cylinder arm 53. In FIG. 5, the direction in which the intermediate-shaft belt 95 runs is shown by two arrows. In addition, a mixer belt 99 and an additional belt 101, which are connected to corresponding toothed belt pulleys 157, 165 on the gear unit 119, run on the intermediate shaft 97 (FIG. 5, FIG. 7). At the same time, the additional belt 101 is additionally tensioned by a tensioning roller 103 held in the gear-mechanism bearing part 23. The intermediate shaft 97 has an upper ball bearing 105 mounted in the upper bearing shell 61 of the gear-mechanism bearing part 23, and a lower ball bearing 107 mounted in the lower bearing shell 63. A first intermediate pinion 109 having an upper, first collar 111 is connected in a rotationally fixed manner to the actual shaft of the intermediate shaft 97. Below this, a second intermediate pinion 113 with a lower, second collar 115 is connected in a corresponding way to the actual shaft. The two pinions, and the areas in which they run, are separated from one another by a flanged disk 117 pressed onto the shaft.

The motor bearing part 21 and the gear-mechanism bearing part 23 are assembled, and the belts 95, 99, 101 are tensioned, in simplified form, as follows: the motor bearing part 21 and the gear-mechanism bearing part 23 are pushed into each other, as described above. On account of the claw-like design of the bearing shell 35 and the configuration of the gear-mechanism bearing cylinder 41, the two bearing parts 21, 23 are connected to each other in a relatively stable manner simply by being pushed into one another (FIGS. 2, 3, 5). They are supported on each other over a relatively large area and mutually engage over each other. However, it is still possible for the bearing parts 21, 23 to be rotated in relation to each other. Between the pinion of the motor shaft 31 and the first intermediate pinion 109 of the intermediate shaft 97, the intermediate-shaft belt 95 runs half-crossed. Because of the direction in which the intermediate-shaft belt 95 runs, the latter runs slightly obliquely upward from the level of the motor shaft 31, through the belt window 69, onto the first intermediate pinion 109. Underneath the flanged disk 117, the additional belt 101 runs in the upper half of the second intermediate pinion 113 to the second toothed belt pulley 165 (FIGS. 5, 7). Directly underneath this, the mixer belt 99 runs, on the second intermediate pinion 113, close to the bottom of the gear-mechanism bearing part 23 and hence to the base of the food-processor 1, to the first toothed belt pulley 157 of the gear unit 119 (FIGS. 5, 7). In order to tension the intermediate-shaft belt 95, the gear-mechanism bearing part 23 is rotated in the bearing shell 35 in the clockwise direction, according to FIG. 5, and hence the distance between the intermediate shaft 97 and the motor shaft 31 is enlarged. This is achieved by the belt tensioner 77 being rotated in the clockwise direction, according to FIG. 5, on the actuating arm 81 in the accommodating region formed by the belt-tensioner bearing shell 73 and the belt-tensioner wall 75. As a result, the clamping cam 87 presses against the belt-tensioner wall 75, as a result of which the distance between the two, and hence also between the motor shaft 31 and the intermediate shaft 97, is enlarged. When the intermediate-shaft belt 95 has been sufficiently tensioned, the relative rotational position of the gear-mechanism bearing part 23 in relation to the motor bearing part 21 is fixed in this position as a result of the set of teeth 83 on the belt tensioner 77 cooperating with the latching tooth 85 on the gear-mechanism bearing part 23. In addition, the relative position of the motor bearing part 21 in relation to the gear-mechanism bearing part 23 may be fixed by adhesive means or by a further screw fixing. Since, during the tensioning of the intermediate-shaft belt 95, the intermediate shaft 97 rotates on a circle about the common central axis of the inner wall 36 of the bearing shell 35 and the outer wall 43 of the gear-mechanism bearing cylinder 41, and since the first and second toothed belt pulleys 157, 165 are also rotatably held on this axis, the distance between the latter and the intermediate shaft 97 does not change. The tensioning of the additional belt 101 with the aid of the tensioning roller 103 may therefore be carried out independently of the tensioning of the intermediate-shaft belt 95. The length of the mixer belt 99 is such that its tensioning with additional aids is not necessary. In this case, the intermediate-shaft belt 95 runs approximately halfway up the inner wall 36 and outer wall 43, which rest on each other (FIG. 7).

The completely preassembled gear unit 119 is then inserted from above into the gear-mechanism bearing cylinder 41 (FIG. 7). The gear unit has external ribs 121, as described below, which cooperate with the bearing ribs 49 on the gear-mechanism bearing cylinder 41 and ensure that the gear unit 119 is seated in a rotationally fixed manner in the gear-mechanism bearing part 23. At the same time, the external ribs 121 on the gear unit 119 in each case rest, by way of their lower end sections, on the extension 51 on the gear-mechanism bearing part 23, by which means the gear unit 119 is supported axially at the bottom. At the top, the gear unit 119 is secured by a round cover plate 123 made of plastic. The latter has two circular steps and, by way of the upper step, forms a cylindrical plate extension 125, which has a circular output-drive opening 127 in the center of its shell-like covering wall. An appropriately designed apron (not illustrated for purposes of clarity) of the bowl 11 is supported on the periphery on a side wall 129 of the plate extension 125. In addition, the bowl 11 is designed with fastening means which are known per se, but are not shown, and cooperate in the manner of a bayonet fixing with the locking elements 131 constructed on the side wall 129. Underneath the second step of the cover plate 123, a flat plate edge 133 extends like a ring, and the hood 3, which also has a circular cut-out in this area, rests on this plate edge, with neither a step nor a gap, with the aid of an annular seal. On the underside of the cover plate 123, an annular plate apron 135 extends from the covering wall of the plate extension 125. Constructed on the outside of this apron, on its periphery, are numerous plate grooves 137, into which it is possible to push springs 138 which are correspondingly formed on the upper edge section 45 of the gear-mechanism bearing cylinder 41 (FIG. 3). The cover plate 123 is thereby connected in a rotationally fixed manner to the gear-mechanism bearing part 23, and is able to pass on into the gear-mechanism bearing part 23 any forces introduced by the bowl 11 into the cover plate 123. Provided on the inner peripheral wall of the plate apron 135, on the periphery, are gear-mechanism stops 139, which extend downward from the underside of the covering wall of the plate extension 125 and are intended to secure the latter axially. In addition, three plate screw sleeves 141 are integrally molded on the underside of the cover plate 123 and, by means of these sleeves, together with the screw eyes or screw sleeves 71, it is possible for the cover plate 123 to be additionally fastened to the gear-mechanism bearing part 23. An annular covering-plate seal 143 is inserted between the edge region of the output drive opening 127 and the gear unit 119.

The gear unit 119 has an outer internal gear wheel 151 which, in its upper region, on the periphery, has the external ribs 121 for the rotationally fixed mounting of the gear unit 119 in the bearing ribs 49 of the gear-mechanism bearing cylinder 41. The internal gear wheel 151 is also supported, by way of the external ribs 121, on the extension 51 on the gear-mechanism bearing cylinder 41. In addition, the internal gear wheel 151 has a first and a second set of inner teeth 153, 154, on which, as is explained below, gear wheels of a planetary gear mechanism roll. Rotatably mounted in the center of the gear unit 119 is an output drive shaft 155. In the lower end section of the output drive shaft 155, the first toothed belt pulley 157 is fastened to this end section in a rotationally fixed manner, using a pressed-on guard plate 159 (FIGS. 5, 7). At the opposite end section, a first coupling bush 161, which extends approximately as far as the level of the covering wall of the plate extension 125 of the cover plate 123, is pressed onto the output drive shaft 155. It is possible for an appropriately constructed working tool, which rotates in a suitable working container, to be coupled to the first coupling bush 161 and to be driven by the output drive shaft 155. The output drive shaft 155 is rotatably mounted in the gear unit 119 by means of two grooved ball bearings 163, as explained below. The upper ball bearing 163 is provided in this case with a sealing washer.

A second toothed belt pulley 165 is rotatably mounted in the gear unit 119, concentrically with the first toothed belt pulley 157. In order to ventilate the gear unit 119, this second toothed belt pulley has cooling ribs 167, which are distributed around the periphery and extend upward. The second toothed belt pulley 165 is supported via an inner bearing shell 169 and an outer bearing shell 171 of the internal gear wheel 151 by means of an open angle-contact ball bearing that is arranged between them on the internal gear wheel 151. The angle-contact ball bearing has, in a manner known per se, an inner bearing ring 173, an outer bearing ring 175 and, between these, a ball support 177 having the corresponding bearing balls. A sleeve-like sun wheel 179 is pushed onto the second toothed belt pulley 165 in a rotationally fixed manner, and secured axially in relation to the latter by a serrated ring 181 pressed into a groove in the sun wheel 179. At its upper end section, the sun wheel 179 is connected, on its inner periphery, to a second coupling bush 185, which has internal toothing and extends upward as far as alongside the first coupling bush 161. The sun wheel 179 and the second coupling bush 185 are supported to the outside in the gear unit 119 via two further open angle-contact ball bearings 187. In order to protect the gear unit 119 and the bearing elements, a sealing ring 189 is placed around the second coupling bush 185. Four first planet gear wheels 191, which are driven by the sun wheel 179, run on the lower, first inner toothing 153 on the internal gear wheel 151. The planet gear wheels 191 each rotate about first needle rollers 195, which are pressed in a rotationally fixed manner into an annular lower region of a first planet carrier 197 and a reinforcing ring 193 that is firmly connected to the latter. The first planet carrier 197 is firmly connected to a sleeve-like, third coupling bush 201, whose set of teeth projects radially outward. In order to seal off the gear unit 119, a sealing ring 203 is also pushed onto the third coupling bush 201. The third coupling bush 201 is supported via an open angle-contact ball bearing 205 on a fourth coupling bush 211 and ultimately on the internal gear wheel 151 of the gear unit 119, as explained below.

On its periphery, the first planet carrier 197 has a set of external teeth 206, on which three second planet gear wheels 207 roll. The latter each rotate, driven by the first planet carrier 197 that serves as the sun wheel, around second needle rollers 209, which are pushed from below into a second planet carrier 211. The upper end section of the latter is constructed as a fourth coupling bush 211. The second planet carrier 211 is supported on the upper end section of the internal gear wheel 151 via balls 213.

The gear unit 119 comprises the metallic output drive shaft 155, which is mounted without direct engagement of teeth in a two-stage planetary gear mechanism that is mounted without play and is made of plastic (FIG. 7). Provided between the plastic gear mechanism and the output drive shaft 155 is an axial clearance 215, in order to be able to compensate for the different coefficients of longitudinal expansion of metal and plastic in the gear unit 119. The output drive shaft 155 rotates, without any step up, essentially at the speed of the motor shaft 31, as does the intermediate shaft 97. In the case of a motor speed under load, the speed of the output drive shaft 155 is then about 8000 to 12,000 revolutions per minute.

The transmission ratio of the second output drive or the second coupling bush 185 is about 5:1. The further transmission ratios, in each case as a ratio of the respective input stage, are about 3.8:1 for the third coupling bush 201 and about 3.1:1 for the fourth coupling bush 211. This results in speeds for the four output drives of about 12,000; 2400; 630 and 200 revolutions per minute. In addition, it is also possible to set the motor speed in stages. As a result, in the region of the four output drives or coupling bushes, it is possible to place all the usual working containers on the food processor at one point, and it is possible to carry out all the operations that are usual for the normal use of the food processor, without additional gear mechanisms for the working tools.

The planetary gear mechanism of the gear unit 119 is constructed in two stages. In order to be able to use the cost-effective, open angle-contact ball bearings 187 and 205, the gear unit 119 is enclosed from above by the second coupling bush 185 and from below by the sun wheel 179, these two being connected to each other without play. The further open angle-contact ball bearing 173, 175, 177 is then held from below in the gear unit 119, without play, with the aid of the serrated ring 181.

We claim:

1. An electric food processor, comprising:
   a housing;
   an electric motor disposed in said housing, said electric motor having a motor shaft;
   a gear mechanism connected to said motor shaft;
   at least three mutually concentric output drives driven by said gear mechanism at mutually different rotational speeds, said output drives having a common axis of rotation at a spaced distance from said motor shaft, and said output drives being adapted to rotate working tools within a working container of the food processor to be placed on said housing;
   said output drives including a fastest, first output drive rotatable at a speed that is suitable for a mixing tool, and relatively slower, second and third output drives; and
   said gear mechanism having at least two sets of independently rotatable input gear teeth whereby the first output drive is driven out of direct engagement with said second and third output drives.

2. The electric food processor according to claim 1, wherein said gear mechanism includes a planetary gear mechanism connecting said second output drive and said third output drive.

3. The electric food processor according to claim 2, wherein said planetary gear mechanism is a multistage planetary gear mechanism.

4. The electric food processor according to claim 2, wherein said second output drive is a sun wheel of said planetary gear mechanism.

5. The electric food processor according to claim 2, wherein said second output drive includes a hollow shaft with an interior, and wherein a shaft of said first output drive is mounted in the interior of said hollow shaft of said second output drive.

6. The electric food processor according to claim 1, which further comprises at least one drive belt connecting said first output drive to said motor shaft.

7. The electric food processor according to claim 1, which further comprises at least one drive belt connecting said second output drive to said motor shaft.

8. The electric food processor according to claim 1, which further comprises at least one first drive belt connecting said first output drive to said motor shaft, and at least one second drive belt connecting said second output drive to said motor shaft.

9. The electric food processor according to claim 1, wherein a relative speed of said concentric output drives decreases from an inner radius of said gear mechanism towards its outer radius.

10. The electric food processor according to claim 1, wherein said concentric output drives rotate at speeds between substantially 200 and substantially 12,000 revolutions per minute.

11. The electric food processor according to claim 1, wherein said concentric output drives all rotate in the same direction of rotation.

12. The electric food processor according to claim 1, wherein said first output drive rotates at substantially a speed of said motor shaft.

13. The electric food processor according to claim 1, wherein said at least three concentric output drives are four concentric output drives.

* * * * *